Patented July 12, 1949

2,475,616

UNITED STATES PATENT OFFICE 2,475,616

THIOSULFATE SALTS

Harold E. Ingraham, Wayne, Pa.

No Drawing. Application February 9, 1945,
Serial No. 577,137

6 Claims. (Cl. 252—182)

The present invention relates to an improved chemical reducing agent and more particularly to a thiosulfate mixed salt which is chemically stable when in a dry state.

Sodium thiosulfate is widely used in the arts, particularly in the fixing of photographic emulsions. Ammonium thiosulfate has also been used to some extent and has been recognized as having advantages over sodium thiosulfate for certain uses. In the fixing of photographic emulsions, for example, ammonium thiosulfate is much faster in its fixing action than sodium thiosulfate and has one and one-half to two times the service life of sodium thiosulfate. However, ammonium thiosulfate is unstable, and when in a dry state decomposes with the loss of ammonia at ordinary temperatures.

Because of its instability, it has been necessary, in the past, to ship ammonium thiosulfate in the form of an aqueous solution usually of a concentration not exceeding about 60%, thus increasing the cost to the consumer because of the freight charges on the water shipped with the salt and requiring more expensive packaging.

Although, as above stated, ammonium thiosulfate is much more rapid and powerful in its chemical action than sodium thiosulfates and this makes the ammonium salt more desirable to use for certain purposes, nevertheless, there have been certain drawbacks besides its instability and greater cost that have militated against its wider use. For example, when used instead of sodium thiosulfate in fixing baths, the greater reducing action of ammonium thiosulfate on the silver image of photographic prints causes graying out of the prints unless the duration of the fixing treatment is very carefully controlled. Consequently, the use of ammonium thiosulfate fixing baths has been heretofore confined largely to the fixing of films, not prints.

Another disadvantage that has heretofore discouraged the wider use of ammonium thiosulfate in fixing baths has been the tendency to staining of the clothing of workers in photographic laboratories that has resulted when portions of the bath, after it has been in use for a time, have been spilled upon or otherwise come into contact with the worker's clothing.

It is an object of the present invention to overcome the foregoing obstacles, and similar obstacles, in the way of a wider use of ammonium thiosulfate in the arts.

A further object of the invention is to provide an ammonium thiosulfate-containing composition which may be used generally for purposes for which ammonium thiosulfate is usable and which is chemically stable when in either a crystalline or an anhydrous state, and hence capable of being stored and shipped without the addition of water.

A further object of the invention is to provide stable crystalline or anhydrous mixed salts of sodium thiosulfate and ammonium thiosulfate.

It is a further object of the invention to provide a simple and relatively inexpensive method of preparing a stable mixed ammonium thiosulfate product in either a crystalline or in anhydrous form having the desirable properties herein mentioned.

The present invention provides an ammonium thiosulfate-containing composition which in a dry state is sufficiently stable against decomposition at ordinary temperatures to permit it to be stored for the periods of time ordinarily encountered in present day distribution practice and to withstand shipping long distances and under the wide ranges of temperature and humidity that are normally encountered when shipping to various parts of the world. Samples of the product stored in a dry place at atmospheric temperature for over six months have shown no tendency to decompose. The composition provides the ammonium thiosulfate in a condition such that it is available for use for the purposes for which pure ammonium thiosulfate is desirable. The composition thus has substantially all of the advantages of ammonium thiosulfate for use in the arts and is free from the principal drawbacks to the use of the pure ammonium salt.

The invention is based, in part, on my discovery that mixed salts of ammonium thiosulfate and sodium thiosulfate can be formed in a crystalline state and in a partially dehydrated or even in a truly anhydrous state, and that such salts will not decompose at ordinary temperatures even when in a completely anhydrous condition.

The invention is further based on the discovery that the mixed salts of sodium thiosulfate and ammonium thiosulfate have characteristics and capabilities not possessed by either of the component salts alone and produce results in certain applications not obtainable with either of the component salts when employed as individuals. Thus, the mixed salt of the present invention will fix developed photographic emulsions much faster than will sodium thiosulfate, or "hypo," but without the risk of staining of clothing which accompanies the use of ammonium thiosulfate, and without danger of bleaching or graying of photographic prints.

The mixed salts of the present invention may contain varying proportions of the ammonium salt and the sodium salt within a wide range. When prepared in one of the ways hereinafter described, the product containing as little as 5% of ammonium thiosulfate, with the balance either entirely sodium thiosulfate or sodium thiosulfate and water of crystallization, will exhibit to a surprising degree a greater and more rapid reducing action as compared with sodium thiosulfate alone. On the other hand, when the proportion of ammonium thiosulfate is increased to 48% and even more, the resulting product is stable, showing no tendency to decompose over long periods of storage, and is characterized by the more rapid reducing action of the ammonium thiosulfate, without, however, exhibiting undesired qualities sometimes heretofore associated with the use of ammonium thiosulfate alone. My investigations show that it is generally desirable to provide sufficient sodium thiosulfate to constitute at least 41% by weight of the final product, and that the product is stable when made up in all proportions that do not fall outside the range thus defined. Because of the wide range of proportions that is permissible, the proportion of each salt present may be selected in accordance with the particular end use for which the composition is destined. When intended to be used as a photographic emulsion fixing agent, I have found that the mixed salt containing from 25% to 35% of ammonium thiosulfate will exhibit the desired rapid fixing action of ammonium thiosulfate without the disadvantages of undue bleaching and staining of clothing that have heretofore been encountered.

The mixed or pseudo double salts under consideration may be formed in various ways. By way of example, the mixed or pseudo double salt may be formed by effecting solution of one of the salts in water, as, for example, by melting sodium thiosulfate crystals in their water of crystallization, and then intimately admixing a solution of the second salt with the first solution, followed by evaporation, if necessary, to a concentration which will permit crystallization to take place. After the mixed crystals have formed, they will be separated from the mother liquor which then may be used in preparing a fresh batch.

As a further and preferred example of a method of preparation, sodium thiosulfate crystals may be melted in their water of crystallization and the resulting melt heated until all or the greater part of the water of crystallization is evaporated. The resulting product is then mixed with an aqueous solution of ammonium thiosulfate proportioned to insure the desired relative amounts of sodium thiosulfate and ammonium thiosulfate in the final product. The resulting mixture is then allowed to cool unless the proportion and dilution of the aqueous solution of ammonium thiosulfate is such as to bring more water into the mixture than can be taken up by the wholly or partially dehydrated sodium thiosulfate. The mixture will solidify on cooling as a crystalline mass. If an excess of water is present after mixing, as above described, the excess can be removed by heating, preferably in a vacuum evaporator, whereupon the mass is allowed to cool and crystallize.

According to a specific example of this method, 100 parts by weight of sodium thiosulfate are heated until about 35 parts of water have been driven off. The remaining product will contain about 1–2 parts of water and 63–64 parts of sodium thiosulfate. This mass is then mixed with 30 parts by weight of a 72% aqueous solution of ammonium thiosulfate. On cooling the mixture solidifies as a crystalline mass and will contain approximately 8–10 parts of water of crystallization, 63–64 parts of sodium thiosulfate and about 22 parts of ammonium thiosulfate. The product is then broken up and ground to a fineness short of that which will promote caking of the dry product when it is packed for distribution.

Instead of preparing the mixed or pseudo double salt by melting or otherwise bringing together the individual salts that have been produced separately, I may bring suitable reactive materials together and carry on the reactions leading to the formation of the respective compounds sodium thiosulfate and ammonium thiosulfate at the same time and in the same reaction zone. For example, sodium sulfite and ammonium sulfite liquors may be mixed in proportions calculated to insure the desired end product. This mixture is then digested with sulfur, thereby forming a mixture of sodium and ammonium thiosulfate. The resulting mixed solution may then be transferred to a vacuum evaporator and subjected to controlled heating until the mixed or pseudo double salt crystallizes out or, if desired, evaporation may be carried further to the point where all water of crystallization is removed and the final mixed product is recovered in anhydrous form.

The resulting dry crystalline material from any of the processes above outlined and which may be in either a truly anhydrous state or contain more or less water of crystallization is found to be stable against loss of ammonia at temperatures up to the melting point of the product.

The mixed or pseudo double salts provided by the present invention will find use in various arts in which either sodium thiosulfate or ammonium thiosulfate have been used heretofore. For example, besides being useful as a fixing agent in photography, they may be used in the tanning of leather in place of the sodium thiosulfate commonly employed, and are effective in the removal of silver sulfide in the cleaning of silver. For photographic purposes the mixed salts have approximately the same speed of action in fixing exposed and developed emulsions as an ammonium thiosulfate fixing bath and are in this respect from two to three times as fast as the conventional "hypo" or sodium thiosulfate fixing bath. The mixed salts, however, in contradistinction to ammonium thiosulfate, can be packaged and shipped dry with a resultant very considerable reduction in freight charges.

While I have disclosed by way of example certain procedures for preparing the mixed or pseudo double salt, it will be understood that the salt may be prepared by other methods which insure that the component or individual salts comprising the same are either formed simultaneously in admixture or are crystallized out from other liquors or mixtures containing the two salts in admixture.

I claim:

1. A stable dry mixed crystal salt of sodium thiosulfate and ammonium thiosulfate, the crystals of which are substantially homogeneous in composition and in which sodium thiosulfate constitutes not less than 41% and ammonium thiosulfate constitutes not less than about 25%, both by weight, of the total thiosulfates present calculated on the anhydrous basis.

2. As a new composition of matter, a stable dry crystalline product composed principally of sodium thiosulfate and ammonium thiosulfate, the crystals of which are substantially homogeneous in composition and in which sodium thiosulfate constitutes not less than 41% and ammonium thiosulfate constitutes not less than about 25%, both by weight, of the total thiosulfates present calculated on the anhydrous basis, with the balance water of crystallization in a proportion not exceeding about 35 parts to each 65 parts, both by weight, of sodium thiosulafte present.

3. As a new product, a stable, anhydrous mixed crystal salt of sodium thiosulfate and ammonium thiosulfate, the crystals of which are substantially homogeneous in composition and which contains 41–75 parts of sodium thiosulfate and 25–59 parts of ammonium thiosulfate both by weight.

4. As a new composition of matter, a dry, mixed crystal product comprising essentially sodium thiosulfate, ammonium thiosulfate and a minor proportion of water of crystallization, the crystals of which are substantially homogeneous in composition and in which sodium thiosulfate constitutes not less than 41% and ammonium thiosulfate constitutes not less than 25%, both by weight, of the total thiosulfates present calculated on the anhydrous basis, said product being characterized by its stability against loss of ammonia at temperatures below its melting point.

5. The method of preparing mixed crystal salts of sodium thiosulfate and ammonium thiosulfate, the crystals of which are substantially homogeneous in composition, which comprises melting crystalline sodium thiosulfate and evaporating at least part of the water of crystallization, thereupon mixing the resulting product with an aqueous solution of ammonium thiosulfate, the proportion of ammonium thiosulfate added being such as to insure that the ammonium thiosulfate content of the mixture, calculated on the anhydrous basis, is between 25 and 59% by weight of the total amount of the two thiosulfate salts present, removing any water present in excess of the amount which will combine as water of crystallization and then allowing the mixture to cool.

6. The method of preparing a stable crystalline mixed crystal product, the crystals of which are substantially homogeneous in composition, consisting essentially of sodium thiosulfate and ammonium thiosulfate which comprises melting sodium thiosulfate crystals and evaporating a large part of the water of crystallization, thereupon mixing the resulting product with an aqueous solution of ammonium thiosulfate containing less water than will combine with the sodium thiosulfate component as water of crystallization, the proportion of ammonium thiosulfate added being such as to insure that the ammonium thiosulfate content of the mixture, calculated on the anhydrous basis, is between 25 and 59% by weight of the total amount of the two thiosulfate salts present, and thereafter allowing the mixture to cool at room temperature.

HAROLD E. INGRAHAM.

REFERENCES CITED

The following references are of record in the file of this patent:

Mellor, Inorganic and Theoretical Chemistry, vol. 10, page 529. Pub. in 1930 by Longmans, Green and Co., London.

Henney et al., Handbook of Photography, page 385. Pub. in 1939 by McGraw-Hill Co., New York.

Hackh's Chemical Dictionary, 3rd ed., page 541. Pub. in 1944 by the Blakiston Co., Philadelphia.